United States Patent
Nunnally

(10) Patent No.: US 6,206,325 B1
(45) Date of Patent: Mar. 27, 2001

(54) ONBOARD AIRCRAFT DE-ICING USING LASERS

(75) Inventor: William C. Nunnally, Columbia, MO (US)

(73) Assignee: Sunlase, Inc., Tulsa, OK (US)

(*) Notice: Subject to any disclaimer, the term of this patent is extended or adjusted under 35 U.S.C. 154(b) by 0 days.

(21) Appl. No.: 09/157,285

(22) Filed: Sep. 18, 1998

(51) Int. Cl.[7] .................................................. B64D 15/00
(52) U.S. Cl. ........................................................ 244/134 E
(58) Field of Search ........................... 244/134 C, 134 D, 244/134 R; 219/121.6, 121.62, 121.65, 121.81

(56) References Cited

U.S. PATENT DOCUMENTS

| | | | |
|---|---|---|---|
| 3,504,025 | * 11/1970 | Levin et sal. ........................ | 244/134 |
| 4,274,091 | * 6/1981 | Decker ................................ | 340/328 |
| 4,365,131 | * 12/1982 | Hansman, Jr.et al. . | |
| 4,378,755 | * 4/1983 | Magnusson et al. . | |
| 4,379,217 | * 4/1983 | Youmans . | |
| 4,549,079 | * 10/1985 | Terasaka et al. . | |
| 4,720,621 | * 1/1988 | Langen . | |
| 4,737,628 | * 4/1994 | Lori . | |
| 4,808,824 | * 2/1989 | SSinnar . | |
| 4,900,891 | * 2/1990 | Vega et al. . | |
| 5,061,836 | * 10/1991 | Martin . | |
| 5,180,122 | 1/1993 | Christian et al. . | |
| 5,218,206 | 6/1993 | Schmitt et al. . | |
| 5,272,340 | 12/1993 | Anbar . | |
| 5,318,254 | 6/1994 | Shaw et al. . | |
| 5,400,144 | 3/1995 | Gagnon . | |
| 5,409,537 | 4/1995 | Poullos et al. . | |
| 5,417,389 | 5/1995 | Chew et al. . | |
| 5,449,882 | 9/1995 | Black et al. . | |
| 5,449,888 | * 9/1995 | Black et al. ....................... | 219/12.83 |
| 5,475,370 | 12/1995 | Stern . | |
| 5,500,502 | 3/1996 | Horita et al. . | |
| 5,500,530 | 3/1996 | Gregoris . | |
| 5,557,261 | 9/1996 | Barbour . | |
| 5,589,822 | 12/1996 | Stern . | |
| 5,597,140 | 1/1997 | Madsen . | |
| 5,615,849 | 4/1997 | Salisbury . | |
| 5,617,076 | 4/1997 | Stern . | |
| 5,623,821 | 4/1997 | Bouiller et al. . | |
| 5,650,610 | 7/1997 | Gagnon . | |
| 5,689,523 | 11/1997 | Seguin . | |
| 5,748,091 | * 5/1998 | Kim ..................................... | 340/583 |
| 5,760,711 | 6/1998 | Burns . | |
| 5,823,474 | * 10/1998 | Nunnally ............................ | 24/134 E |
| 6,091,335 | * 7/2000 | Breda et al. ....................... | 244/134 F |

FOREIGN PATENT DOCUMENTS

7800071 * 6/1979 (WO) .

* cited by examiner

Primary Examiner—Peter M. Poon
Assistant Examiner—Judith A. Nelson
(74) Attorney, Agent, or Firm—Mark A. Rogers; Gary N. Speed

(57) ABSTRACT

An aircraft de-icing system is disclosed in which a laser beam generator is positioned on an aircraft, a beam of radiant energy is generated and directed toward the critical surfaces of the aircraft to create a footprint upon the surface of the aircraft, and the beam is manipulated so that the footprint is moved about the aircraft surface for removing ice, snow or water from the critical aircraft surfaces. One or more laser beam generators are preferably disposed remotely from the area to be de-iced, and the beams are preferably reflected from one or more mirrors so that the mirrors may be adjusted to enable the beams to illuminate the critical surfaces of the aircraft. The laser beams preferably have a wavelength that is preferentially reflected by the aircraft surface and absorbed by ice, snow and water, so that the beam heats and removes ice, snow and water from the aircraft surface as the beam's footprint is moved thereabouts.

20 Claims, 3 Drawing Sheets

ONBOARD AIRCRAFT DE-ICING USING LASERS

BACKGROUND OF THE INVENTION

This invention relates to aircraft de-icing and, more particularly, to a system and method of onboard de-icing.

Ice formation on aircraft surfaces, particularly wing surfaces, during cold weather is a problem that can have catastrophic consequences. Ice increases aircraft weight and can reduce lift and interfere with the functioning of moving parts. A number of systems are available and in use for preventing icing or for de-icing an aircraft surface while an aircraft is in flight. These include de-icing devices which remove ice by scraping or cracking, devices which melt the ice with microwave heating and devices which employ electrothermal heating within the structure to be de-iced. These devices are typically slow and inefficient. They must also typically be positioned in or adjacent the area to be de-iced and lack the flexibility to de-ice different surfaces and moving parts of the airfoil.

It has also been proposed to use ground based laser light systems to de-ice aircraft. Such systems typically use complex, bulky and cumbersome booms to hold laser light generators in close proximity to an aircraft surface and to manipulate the laser light generators about the aircraft surface to be de-iced. In U.S. patent application Ser. No. 08/706,598, filed by the present inventor, a laser de-icing method and system are disclosed which overcome many of the problems of earlier laser de-icing systems. The entire content of U.S. patent application Ser. No. 08/706,598 is incorporated by reference herein as if set forth fully herein. While laser de-icing offers a relatively fast and efficient way of removing ice from an aircraft and reduces or eliminates the need to spray outer surfaces with glycol solutions for de-icing on the ground, earlier approaches of others to laser de-icing are not without problems. For example, ground based systems proposed by others do not permit in flight de-icing and significantly limit the flexibility of the system to de-ice the aircraft when and where needed. Furthermore, glycol based de-icing systems must use additional glycol mixtures and compounds to enable the aircraft to travel from the de-icing station to the runway and to preserve the ice free condition during take-off. The anti-icing glycol mixtures and compounds provide several minutes of ice free conditions. If the aircraft exceeds the specified "safe" period, the aircraft must return to the de-icing station.

SUMMARY OF THE INVENTION

It is therefore an object of the present invention to provide a system and method of onboard aircraft de-icing using a laser beam.

It is a still further object of the present invention to provide a system and method of the above type that permits the laser beam to be manipulated so that a footprint of the beam may be moved about the surface of the aircraft.

It is a still further object of the present invention to provide a system and method of the above type that uses a laser beam having a wavelength which is preferentially reflected by aircraft surfaces and absorbed by ice, snow or water.

It is a still further object of the present invention to provide a system and method of the above type that uses a laser beam generator that generates optical energy in the 10 micron to 11 micron wavelength range.

It is a still further object of the present invention to provide a system and method of the above type that uses a $CO_2$ or CO laser beam generator.

It is a further object of the present invention to provide a system and method of the above type in which the equipment needed for the system may be easily affixed to and removed from an aircraft.

It is a still further object of the present invention to provide a system and method of the above type that permits de-icing of an aircraft on the ground and in the air.

It is a still further object of the present invention to provide a system and method of the above type that may be powered by auxiliary power sources already present on aircraft or that may be powered by additional power sources installed on aircraft.

It is a still further object of the present invention to provide a system and method of the above type that permits the laser beam that provides the flexibility to de-ice different areas and structures at and about the critical surface areas of the aircraft.

It is a still further object of the present invention to provide a system and method of the above type that provides flexibility in treating hard to reach regions of an aircraft surface.

It is a still further object of the present invention to provide a system and method of the above type that permits a beam generated by a single laser beam generator to quickly and easily treat a large region on an aircraft surface without regard for whether the region is horizontal, vertical, sloping, rounded or any combination thereof.

It is a still further object of the present invention to provide a system and method of the above type which can maintain critical surfaces in an ice free condition during taxiing and takeoff, thereby reducing or eliminating the need to use anti-icing gel fluids that are presently used.

It is a still further object of the present invention to provide a system and method of the above type which can prevent in flight ice formation on critical surfaces without reducing aerodynamic performance of the critical surfaces.

It is a still further object of the present invention to provide a system and method of the above type in which the radiant energy of the beam is absorbed at or near the surface of the ice so that ice may be melted or vaporized selectively without substantial portions of the optical energy reaching the aircraft surface.

Toward the fulfillment of these and other objects and advantages, the aircraft de-icing system of the present invention involves positioning a laser beam generator on an aircraft, generating a beam of radiant energy, directing the beam toward the aircraft to create a footprint upon a surface of the aircraft, and manipulating the beam so that the footprint is moved about the aircraft surface for removing ice, snow or water from the aircraft surface. The laser beam generator is preferably disposed remotely from the area to be de-iced, and the beam is preferably reflected from a mirror so that the mirror may be manipulated to move the footprint about the aircraft surface. The beam may have a wavelength that is preferentially reflected by the aircraft surface and absorbed by ice, snow and water, so that the beam heats and removes ice, snow and water from the aircraft surface as the beam's footprint is moved thereabouts.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
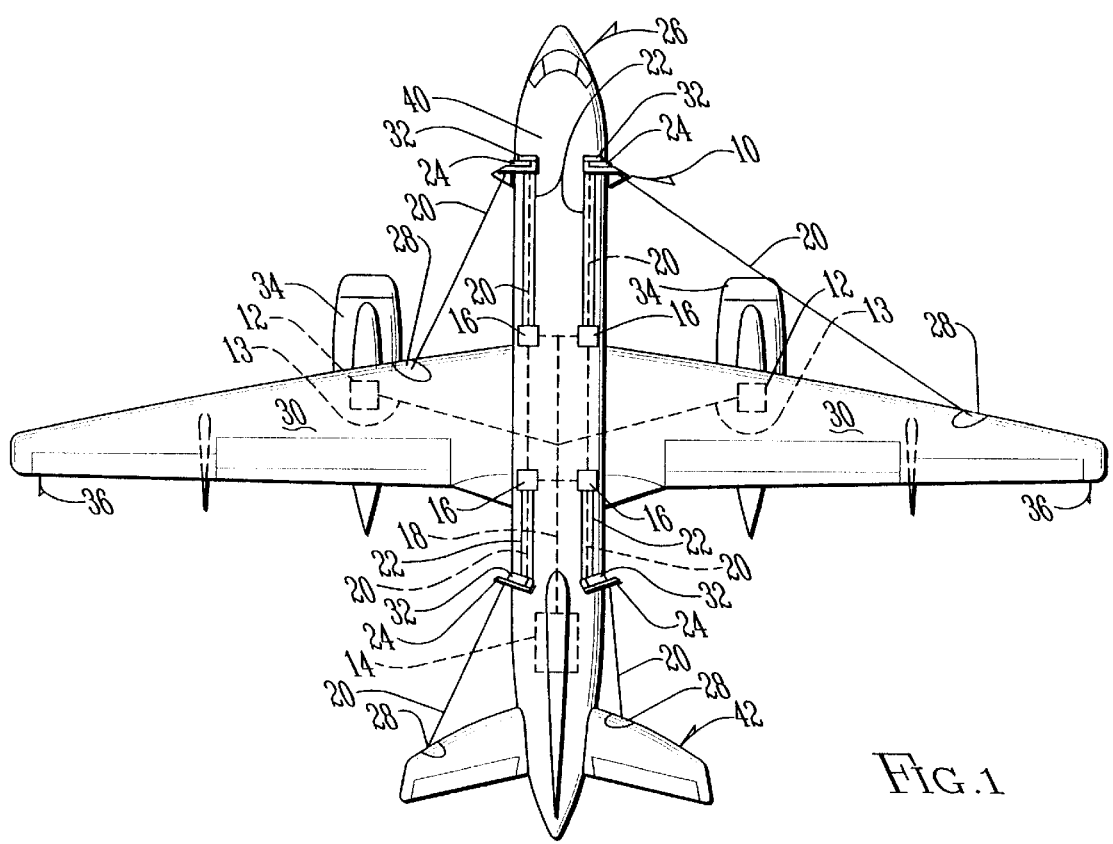
FIG. 1 is an overhead schematic view of a de-icing system of the present invention.

Referring to FIG. 1, the reference numeral 10 refers in general to a de-icing system of the present invention. An auxiliary power unit 12 provides power via cables 13 to a radio frequency or microwave generator 14 that then transmits the power to the individual laser beam generators 16 via coaxial cables or waveguides 18. Each laser beam generator 16 generates a beam 20 which passes through a conduit 22, strikes a mirror 24 and is reflected toward the aircraft 26 where the beam forms a footprint 28 on the surface 30 of the aircraft. Drivers 32 are operatively connected to the mirrors 24 to manipulate or move the mirrors 24 to move the beams 20 about the aircraft surface 30.

Figure 2:
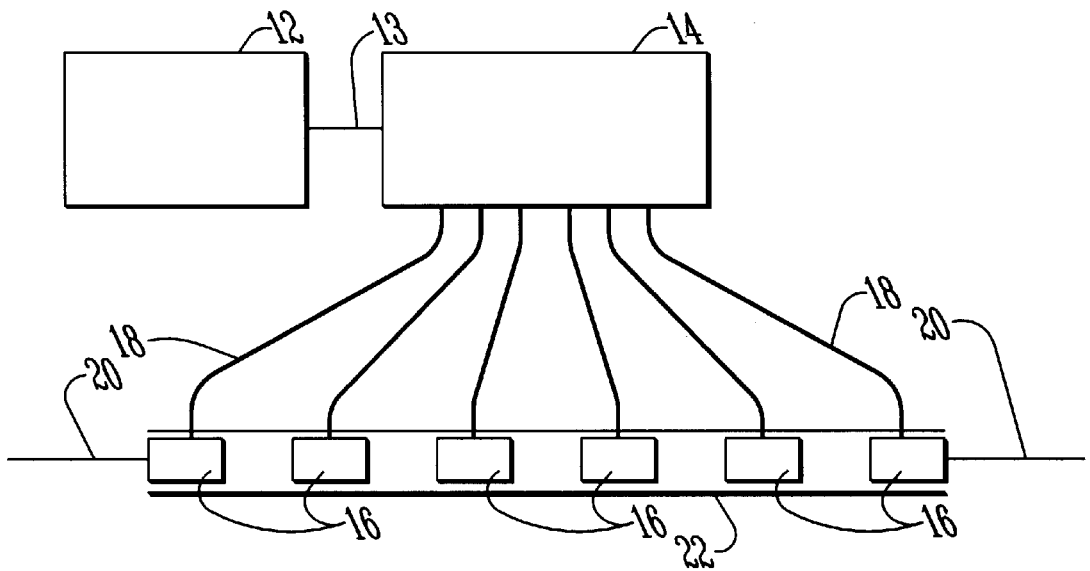
FIG. 2 is a schematic view of a de-icing system of the present invention.
Figure 5:
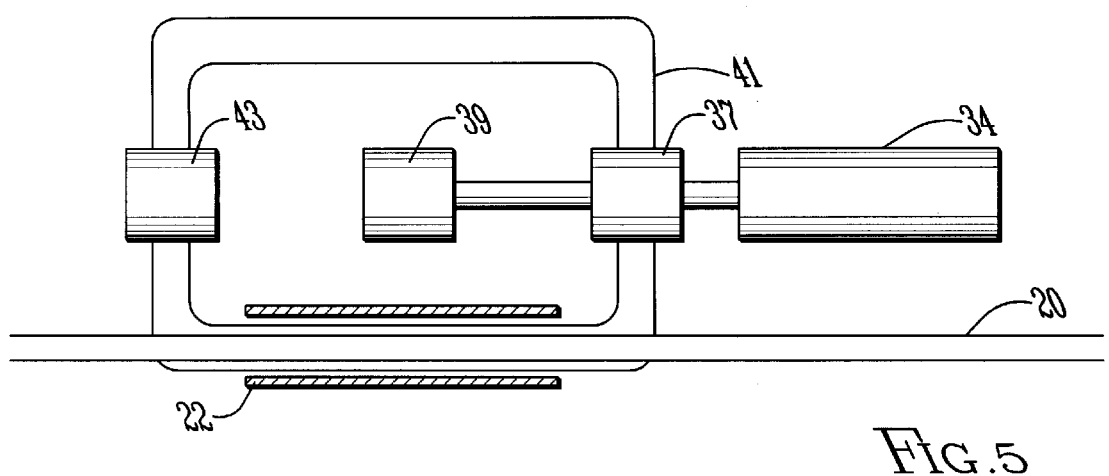
FIG. 5 is a schematic view of a de-icing system of the present invention.

The auxiliary power unit 12 is part of the existing aircraft power system of the kind which is typically present in commercial aircraft and which can supply several hundred kilowatts of electrical power for powering the system 10. The auxiliary power unit 12 is typically disposed adjacent a gas turbine engine 34 on a wing 36. It is of course understood that a self-contained unit, including its own power supply, could be used or that some combination of different power sources could be used. As best seen in FIG. 2, the auxiliary power unit 12 is operably connected to a radio frequency or microwave generator 14 by cables 13 to provide power to the radio frequency or microwave generator 14. The radio frequency or microwave generator 14 then transmits the power to the individual laser beam generators 16 using coaxial cables or waveguides 18. In an alternate embodiment depicted in FIG. 5, the gas turbine 34 powers a turbo pump 37 and turbo generator 39 to circulate a gas such as $CO_2$ through a recirculation loop 41 which includes a heat exchanger 43. The recirculation loop 41 passes through the conduit 22 for generating a beam 20 within the conduit 20.

A compact laser beam generator 16, preferably a $CO_2$ laser beam generator, is used to generate an efficient, high power, infrared laser beam 20. An example of a compact $CO_2$ laser beam generator is described in U.S. Pat. No. 5,689,523, issued to Seguin, the entirety of which is incorporated by reference herein as if fully set forth herein. The laser efficiency is preferably within a range of approximately 30% to approximately 50%, and more preferably approximately 33%. It is understood that other laser beam generators may be used. For example, a CO laser beam generator may generate a beam with similar efficiencies, having a wavelength substantially within the range of approximately 9 microns to approximately 11 microns. The power of the generated beam 20 is preferably substantially within a range of approximately 25 kW to approximately 50 kW and is more preferably approximately 50 kW. The wavelength of the beam 20 is preferably selected from a range that is preferentially reflected by the aircraft surface 30 and absorbed by ice, snow and water 38. The wavelength is preferably substantially within a range of approximately 8 microns to approximately 15 microns, is more preferably substantially within a range of approximately 9 microns to approximately 11 microns, and is most preferably within a range of approximately 10 microns to approximately 11 microns. It is understood that different wavelengths may be used and that wavelengths may be used which are preferentially absorbed or reflected by various areas of the aircraft surface or by ice, snow or water 38.

The optical absorption depth of a beam 20 having a wavelength of approximately 10 microns to 11 microns in ice, snow and water 38 is approximately 0.1 mm, so the infrared optical energy is absorbed at the surface of the ice, snow or water, and the ice, snow or water is melted or evaporated selectively without significant amounts of the optical energy reaching the aircraft surface 30. In contrast, the metals comprising much of the aircraft surface 30 reflect approximately 90% to approximately 95% of optical energy at a wavelength of approximately 10 microns to approximately 11 microns, so little of the optical energy is absorbed by the metal surfaces, making it possible to use such beams 20 without significantly increasing the temperature of such metal surfaces. Composite structures located at various portions or regions of an aircraft surface 30 may be painted with a metal pigment paint to reflect the optical energy. Conversely, critical surfaces may also be treated with absorptive paints and materials to absorb and conduct thermal energy to other critical areas. Also, the optical absorption depth of 10 to 11 micron energy in plastic and glass is approximately 1 to 2 mm, so passengers and pilots are protected from scattered light in the unlikely event that the beam 20 is accidentally pointed at an aircraft window. Similarly, work crews may be protected using protective clothing, optical glasses or goggles and helmets as would typically be worn in cold weather.

Conduits 22 are disposed to run along opposite sides of the fuselage 40 for housing the laser beam generators 16 and for providing a passageway for the beams 20 as the beams 20 pass from the laser beam generators 16 to the mirrors 24. A desired number of generators 16 may be disposed at various locations along the conduit 22 for directing beams 20 directly toward the aircraft surface 30 or for directing beams 20 toward mirrors 24 which in turn reflect the beams 20 to the aircraft surface 30. The conduits 22 may be affixed to the outside of the fuselage 40 or may be secured within the fuselage and may extend to regions other than the fuselage to route or "pipe" beams 20 as desired. The conduits 22 and, in fact, the entire system 10 may be easily serviceable and may be easily removable for those aircraft 26 not operating in potentially icing conditions.

The mirrors 24 are high average power metal mirrors, such as cooled copper mirrors, similar to those developed by the military for directing laser beams in applications such as anti-missile systems for aircraft. The metal mirrors 24 expand the 25 kW laser beam 20 such that the intensity or power density is substantially within a range which is preferably from approximately 5 kW/m$^2$ to approximately 50 kW/m$^2$, is more preferably from approximately 10 kW/m$^2$ to approximately 50 kW/m$^2$, and is most preferably approximately 25 kW/m$^2$. A power density of 25 kW/m$^2$ is about 25 times that of sunlight at sea level on the equator, or 25 suns. The mirrors 24 reflect the beams 20 toward the aircraft surface 30 so that the beams 20 impinge upon and create footprints 28 on the aircraft surface having an area of approximately 0.5 m². The mirrors 24 may be movable between a deployed position in which at least a portion of the mirrors 24 are disposed externally to the fuselage 40 or conduit 22 and a retracted position in which the mirrors are disposed within cavities in the fuselage or conduit. As one alternative, the mirrors 24 may be permanently positioned within a cavity in the fuselage 40 or conduit 22 or, similarly, may be permanently positioned with at least a portion disposed externally to the fuselage or conduit Germanium or salt beam splitters or laser windows may be used to pass the beam simultaneously to more than one conduit 22 or mirror 24 but are not preferred because of the cost and complexity of fabricating such beam splitters or laser windows with sufficient capabilities for use with the system.

Drivers or motors 32 are used to align and control movements of the mirrors 24 to permit the mirrors to move the reflected beams 20 so that the footprint 28 of each beam may be moved about the aircraft surface 30, for example, along leading edges of the wings and tail sections 42. The speed at which the footprints 28 will move across the surface 30 will vary depending upon such things as ice thickness and other conditions but can easily fall within a range of approximately 0.1 m/s to approximately 1.0 m/s. It is understood that the laser beam generators 16 may direct the beams 20 directly toward the aircraft surface 30 without the use of mirrors 24, in which case drivers or motors 32 may be operatively connected to the laser beam generators so that the footprint 28 may be moved about the aircraft surface 30.

Figure 3:
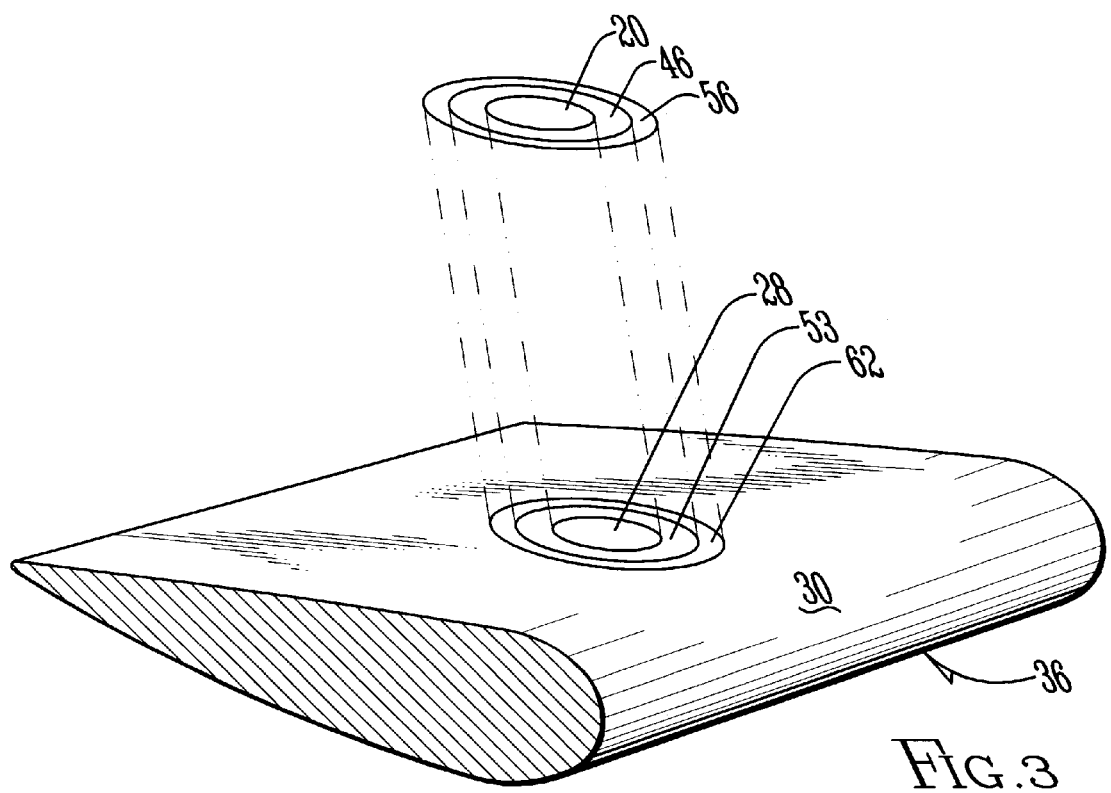
FIG. 3 is a view showing overlapping footprints created on an aircraft surface by a laser beam, an ice detection system, and a visible light source in accordance with an alternate embodiment of the system of the present invention.
Figure 4:
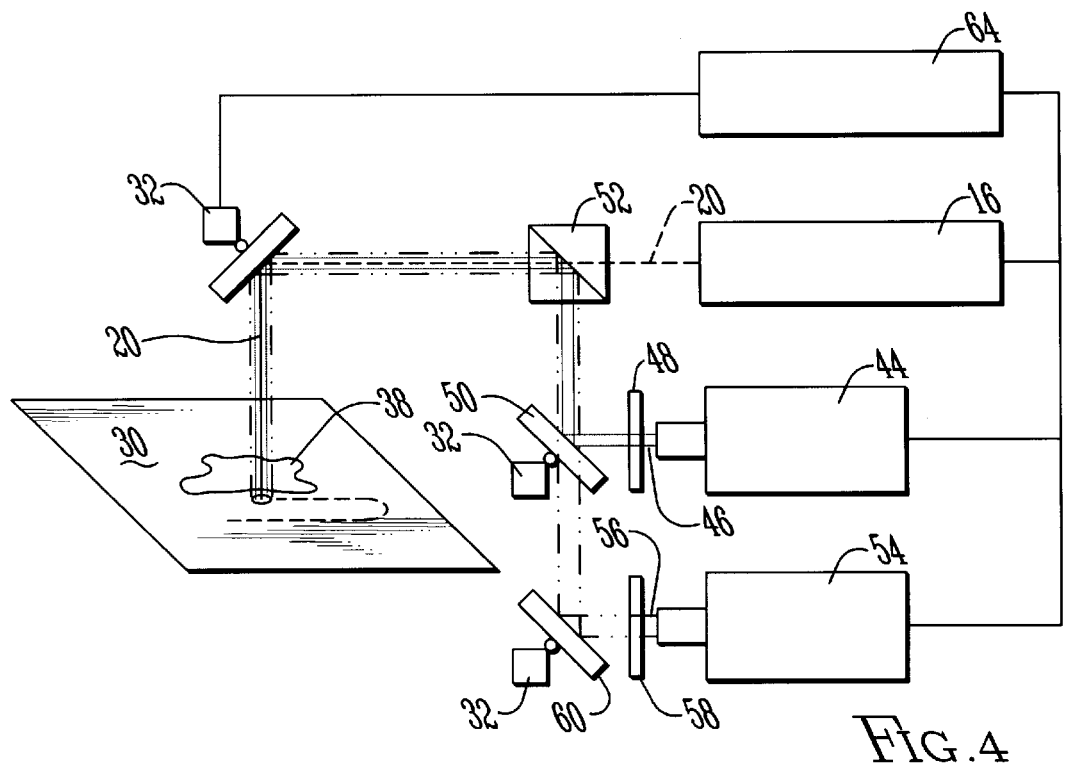
FIG. 4 is a schematic view of an alternate embodiment of an ice detection and de-icing system of the present invention.

In an alternate embodiment, depicted in FIGS. 3 and 4, the system 10 may be equipped for remote detection of ice using a thermal monitoring system like the system described in more detail in U.S. patent application Ser. No. 08/706,598, filed by the present inventor. As discussed in that application, the wavelength of the beam 20 is selected from a range that is preferentially reflected by the aircraft surface 30 and absorbed by ice, snow and water 38. In that regard, for a beam 20 having a wavelength within a range of approximately 10 microns to approximately 11 microns, the aircraft surface 30 reflects such a beam 20 with approximately 90% to 95% efficiency, whereas ice, snow and water strongly absorb such radiation. Accordingly, as the beam 20 scans the aircraft surface 30, regions of the aircraft surface that are covered with ice, snow or water 38 will experience temperature rises at relatively increased rates as compared to regions clear thereof. The thermal monitoring system uses an infrared thermal camera 44 that generates a beam 46 having a wavelength different from that of beam 20. The wavelength of beam 46 is preferably within a range of approximately 1 to 2 microns and is more preferably approximately 1.5 microns. As best shown in FIG. 4, the beam 46 passes from the infrared thermal camera 44 through the 1 to 2 micron near infrared narrow band transmission filter 48 and is reflected by the near infrared beam splitter 50, salt window 52 and mirrors 24 to create a footprint 53 on the aircraft surface 30. The camera 44 can resolve temperature differences of approximately 1 or 2 degrees C. and can create an image of a scanned aircraft surface 30 to highlight regions experiencing temperature rises at relatively increased rates, indicating the presence of ice, snow or water 38 which are preferentially absorbing the long wavelength thermal energy. The thermal monitoring system can therefore be used to detect the presence of ice, snow or water 38 on an aircraft surface 30 and to document the location of the ice, snow or water by imaging the region of interest as it is scanned. The system may also be used to determine ice thickness by determining the time required to melt through the ice to the underlying reflective aircraft surface 30 using a stationary beam 20. Pre-programmed point measurement of ice thickness over the surface can also be used to build a point-by-point map of the surface ice thickness. The remote ice detection and imaging capabilities of the thermal monitoring system also permit the thermal monitoring system to continually monitor the aircraft surface 30 for the presence of ice, snow or water and to verify, confirm or certify that the aircraft 26 is substantially free of ice, snow or water during flight or after treatment.

As best seen in FIGS. 3 and 4, a visible light source 54, for example a source of a visible, low power laser beam 56, such as a red HeNe beam having a wavelength of approximately 0.62 microns, may be used in connection with the system 10 to highlight the location of the footprint 28 of beam 20 as the beam 20 footprint 28 scans, or is moved about, the aircraft surface 30. The visible beam 56 passes through a visible beam narrow band transmission filter 58, is reflected by visible mirror 60, passes through beam splitter 50 and is reflected by Zinc Selenide window 52 and mirrors 24 so that it creates a footprint 62 on the aircraft 26 that substantially overlaps with the footprints 28 and 53 of beams 20 and 46. The footprint 62 of beam 56 also moves with the footprints 28 and 53 created by beams 20 and 46 as the footprints scan or move about the aircraft surface 30.

As indicated in FIG. 4, computer based controls 64 may be used for such things as aircraft image recognition, laser or mirror positioning and control, and temperature sensing and imaging. Computer controls permit the beam 20 to follow a pre-determined scan pattern designed for the particular aircraft or conditions. Computer controls 64 also permit instantaneous beam positioning and intensity control for safety purposes. In that regard, the laser intensity is controllable by the computer controls in a sub-second time scale such that the laser power can be adjusted over a large range, such as from approximately 10% to approximately 100% as the beam 20 is scanned across an aircraft 26. The computerized control 64 permits the system to apply thermal energy in a predetermined pattern, monitor surfaces for ice, snow and water 38, control exposure for instantaneous safety control and certify aircraft condition during flight or at the end of the de-icing or anti-icing procedure.

In operation, an operator engages auxiliary power unit 12 to provide power to the radio frequency or microwave generator 14 which in turn powers the laser beam generators 16. Beams 20 are generated and pass through conduits 22 to mirrors 24 where the beams 20 are reflected by the mirrors 24 to impinge upon and create footprints 28 upon the aircraft surface 30, such as on leading edges of the wings 36 and tail section 42. Drivers 32 manipulate the mirrors 24 to move the footprints 28 of the beams 20 about the aircraft surface 30. The movement may be in a predetermined pattern or may be based upon manual controls and observation. Each beam 20 melts or evaporates the ice, snow or water 38 as its footprint 28 moves about the surface 30 of the aircraft. If used, the thermal monitoring system monitors the aircraft surface for the continued presence of ice, snow or water 38. Unlike radiant systems or laser systems lacking the flexibility to treat hard to reach areas, the directivity of the laser beam 20 permits the present system 10 to treat interior compartments, such as air brakes and aileron, when they are opened during de-icing. In that regard, once the beam 20 enters the interior compartments, it will reflect from the metal surfaces and bounce around the interior compartment to reach most or all of the areas therein.

Upon completion of a predetermined pattern, or upon certification or verification by the thermal monitoring system or other means that the aircraft 26 is or has been placed in an acceptable condition, the system 10 is deactivated. The system 10 may be used while the aircraft is on the ground or in flight. Of course, the present de-icing system 10 may also by used in place of or in combination with other de-icing or anti-icing methods. For example, after de-icing an aircraft 26 using another method, the present system 10 may be used as an anti-icing measure as the aircraft 26 taxis to or waits on a runway.

An order of magnitude estimation of the laser power requirements necessary to deliver radiant energy to critical areas of an aircraft 26 while in flight is shown in Table 1.

TABLE I

Laser Size Calculations and Power Requirements for Airborne Systems

| Parameter | Case 1 | Case 2 | Units |
|---|---|---|---|
| Critical Surface Area | 20 | 20 | $m^2$ |
| Average Laser Power Density | 5 | 10 | suns |
|  | 5,000 | 10,000 | $W/m^2$ |
| Total Laser Power | 100 | 200 | kW |
| Laser Efficiency | 0.33 | 0.33 |  |
| Electrical + Pump Power | 303 | 606 | kW |
| Horsepower Equivalent | 404.04 | 808.08 | Hp |
| Energy Conversion Efficiency | 0.50 | 0.50 |  |
| Engine Horsepower Requirements | 808.08 | 1616.16 | Hp |

The calculations illustrate that an onboard de-icing system 10 of the present invention is feasible because commercially available $CO_2$ laser beam generators 16 are presently on the market with average power levels of 50 kW and larger, and existing aircraft power systems on commercial aircraft can supply up to several hundred kilowatts of electrical power.

Other modifications, changes and substitutions are intended in the foregoing, and in some instances, some features of the invention will be employed without a corresponding use of other features. For example, although the present invention is described for use in connection with aircraft 26, the system 10 may be used to detect and remove ice, snow and water 38 from other surfaces, as well. Further, it is understood that the term aircraft as used herein includes but is not limited to airplanes, jets, helicopters, and space craft. Similarly, it is understood that the term aircraft surface as used herein includes moving and nonmoving parts and components. Further still, although the beam 20 is described as being manipulated to move the footprint 28 about the surface 30 of the aircraft, it is understood that the location of the footprint 28 may be fixed relative to the aircraft surface 30. Also, the system 10 may be used in connection with the removal of substances other than or in addition to ice, snow and water. Further, the de-icing system 10 may be used without using the ice detection system described and without using the accompanying visible light source 54 for tracking. Further still, the ice detection system may operate independently of the de-icing system 10, and beam 46 need not track beam 20 as the footprints 53 and 28 of the beams move about the aircraft surface 30. Also, any number, configuration or arrangement of conduits 22 may be used, or the system 10 may be used without conduits 22. Although a $CO_2$ laser beam 20 is preferred, any number of suitable coherent beams of radiant energy may be used, including but not limited to CO lasers. Also, although the beams 20, 46 and 56 are shown as traveling over the same path over much of their lengths, separate mirror or optical systems may be used for one or more of the beams. Of course, measurements and other numerical values given in connection with such things as preferred ranges for efficiencies, power, wavelengths and other values, are given by way of example and are not intended to limit the scope of the invention. Accordingly, it is appropriate that the appended claims be construed broadly and in a manner consistent with the scope of the invention.

What is claimed is:

1. A method of de-icing an aircraft comprising:

(a) securing a laser beam generator to an aircraft;

(b) generating a beam of radiant energy;

(c) directing said beam toward said aircraft so that said beam creates a footprint upon a surface of said aircraft; and (d) manipulating said beam so that said footprint is moved about said aircraft surface for removing ice, snow or water from said aircraft surface.

2. The method of claim 1 wherein said beam has a wavelength substantially within a range of approximately 8 microns to approximately 15 microns.

3. The method of claim 1 wherein said beam has a wavelength substantially within a range of approximately 9 microns to approximately 11 microns.

4. The method of claim 1 wherein said beam has a wavelength substantially within a range of approximately 10 microns to approximately 11 microns.

5. The method of 1 wherein said beam has a wavelength substantially within a range that is preferentially reflected by said aircraft surface and absorbed by ice, snow or water.

6. The method of claim 1 wherein step (a) comprises positioning said generator on said aircraft remotely from said aircraft surface to be de-iced.

7. The method of claim 1 wherein:

step (a) comprises positioning said generator on a fuselage of said aircraft; and step (c) comprises directing said beam toward said aircraft so that said beam creates said footprint upon a wing of said aircraft.

8. The method of claim 1 wherein said beam has a power density substantially within a range of from approximately 10 suns to approximately 50 suns.

9. The method of claim 1 further comprising:

(a) positioning a mirror on said aircraft;

(b) directing said beam toward said mirror; and (c) reflecting said beam from said mirror so that said reflected beam creates said footprint upon said surface of said aircraft.

10. The method of claim 9, further comprising:

positioning a conduit on said aircraft; and directing said beam from said generator, through said conduit and to said mirror.

11. A method of de-icing an aircraft comprising:

(a) positioning a laser beam generator on an aircraft;

(b) generating a beam of radiant energy having a wavelength substantially within a range of from approximately 8 microns to approximately 15 microns; and (c) directing said beam at said aircraft so that said beam creates a footprint upon a surface of said aircraft.

12. The method of claim 11, further comprising:

(a) positioning a mirror on said aircraft;

(b) directing said beam at said mirror; and (c) reflecting said beam from said mirror so that said reflected beam creates said footprint upon said surface of said aircraft.

13. The method of claim 11 wherein step (a) comprises positioning said generator on said aircraft remotely from said aircraft surface to be de-iced.

14. The method of claim 11 wherein:
step (a) comprises positioning said generator on a fuselage of said aircraft; and
step (c) comprises directing said beam at said aircraft so that said beam creates said footprint upon a wing of said aircraft.

15. A combination for deicing an aircraft, comprising:
an aircraft;
a laser beam generator for generating a beam of radiant energy, said generator being secured to said aircraft; and
a mirror secured to said aircraft and positioned for reflecting said beam toward said aircraft to create a footprint upon a surface of said aircraft.

16. The combination of claim 15 wherein said generator is secured to a fuselage of said aircraft.

17. The combination of claim 15 wherein said mirror is secured to a fuselage of said aircraft.

18. The combination of claim 15 further comprising a conduit, said conduit being secured to said aircraft and being positioned so that said beam passes from said generator and through said conduit before being reflected from said mirror.

19. The combination of claim 15 further comprising a driver operatively connected to said mirror to manipulate said mirror for moving said footprint about said surface of said aircraft.

20. The combination of claim 15 wherein said generator is selected from the group consisting of a $CO_2$ laser beam generator and a CO laser beam generator.

* * * * *